(12) United States Patent
Deal, Jr.

(10) Patent No.: US 7,585,135 B1
(45) Date of Patent: Sep. 8, 2009

(54) MARSH AND WETLAND REHABILITATION SYSTEM AND ASSOCIATED METHODS

(76) Inventor: Troy M. Deal, Jr., 1331 W. Central Blvd., Orlando, FL (US) 32805

( * ) Notice: Subject to any disclaimer, the term of this patent is extended or adjusted under 35 U.S.C. 154(b) by 701 days.

(21) Appl. No.: 11/221,378

(22) Filed: Sep. 7, 2005

(51) Int. Cl.
*E02B 7/06* (2006.01)
*E02B 11/00* (2006.01)
*E02B 13/00* (2006.01)
*E02D 3/00* (2006.01)
*E21D 20/00* (2006.01)

(52) U.S. Cl. .................... 405/258.1; 405/117; 405/303; 405/36; 405/52; 405/264; 37/195; 37/307; 37/301

(58) Field of Classification Search .............. 405/258.1, 405/117, 303, 36, 52, 263, 264; 37/195, 37/307, 301
See application file for complete search history.

(56) References Cited

U.S. PATENT DOCUMENTS 4,896,445 A * 1/1990 Deal ........................... 37/195
5,556,033 A * 9/1996 Nachtman ................... 239/343

* cited by examiner

*Primary Examiner*—Christopher J. Novosad
(74) *Attorney, Agent, or Firm*—Allen Dyer Doppelt Milbrath & Gilchrist

(57) ABSTRACT

A method for constructing or rehabilitating a marsh or wetland comprises the step of inserting propagatable material into liquid or slurry emerging from a high-pressure spray nozzle to form a mixture. The liquid/ or slurry/propagatable material mixture is then sprayed over a marsh or wetland area desired to be constructed or rehabilitated.

8 Claims, 2 Drawing Sheets

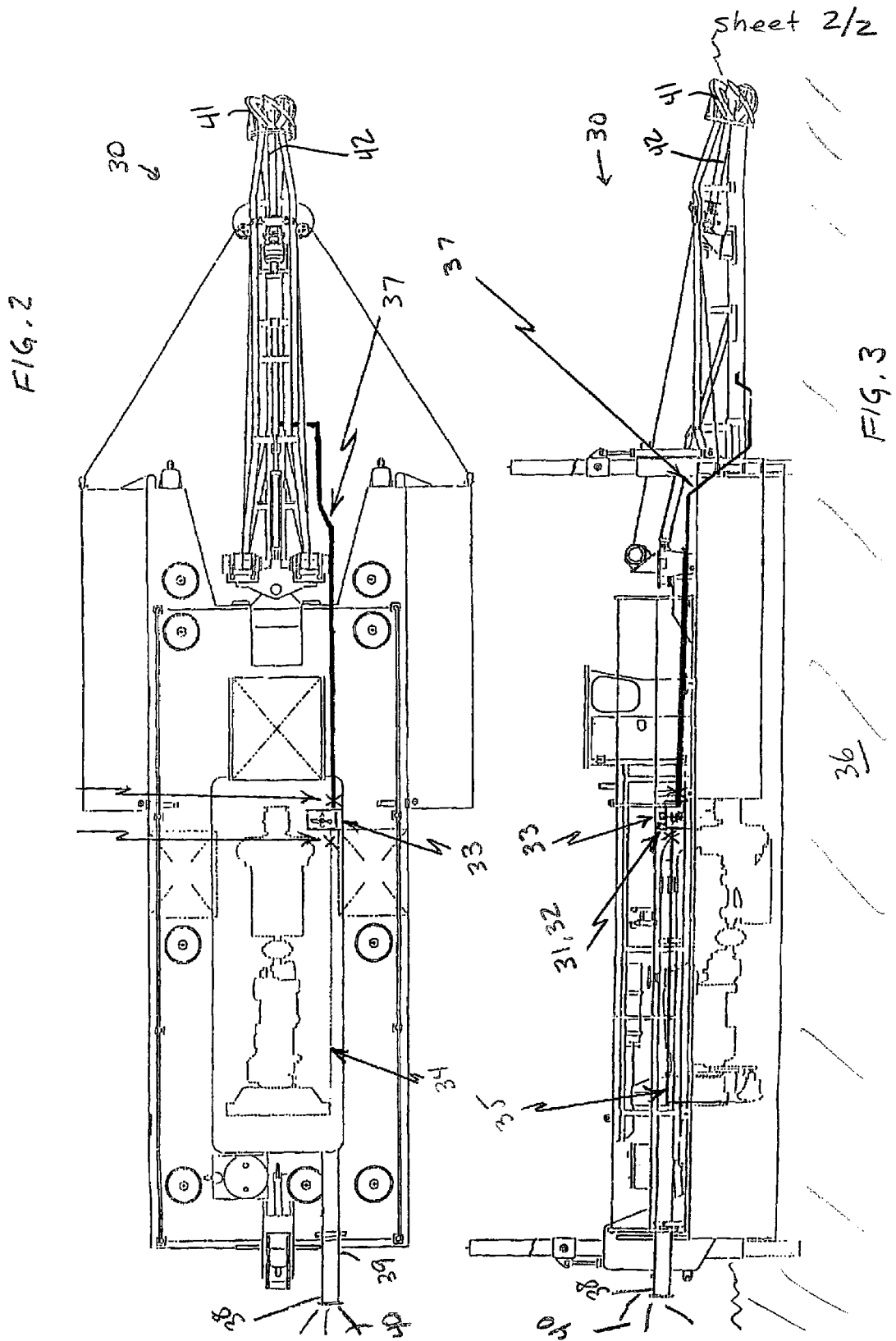

MARSH AND WETLAND REHABILITATION SYSTEM AND ASSOCIATED METHODS

BACKGROUND OF THE INVENTION

1. Field of the Invention

Figure 1:
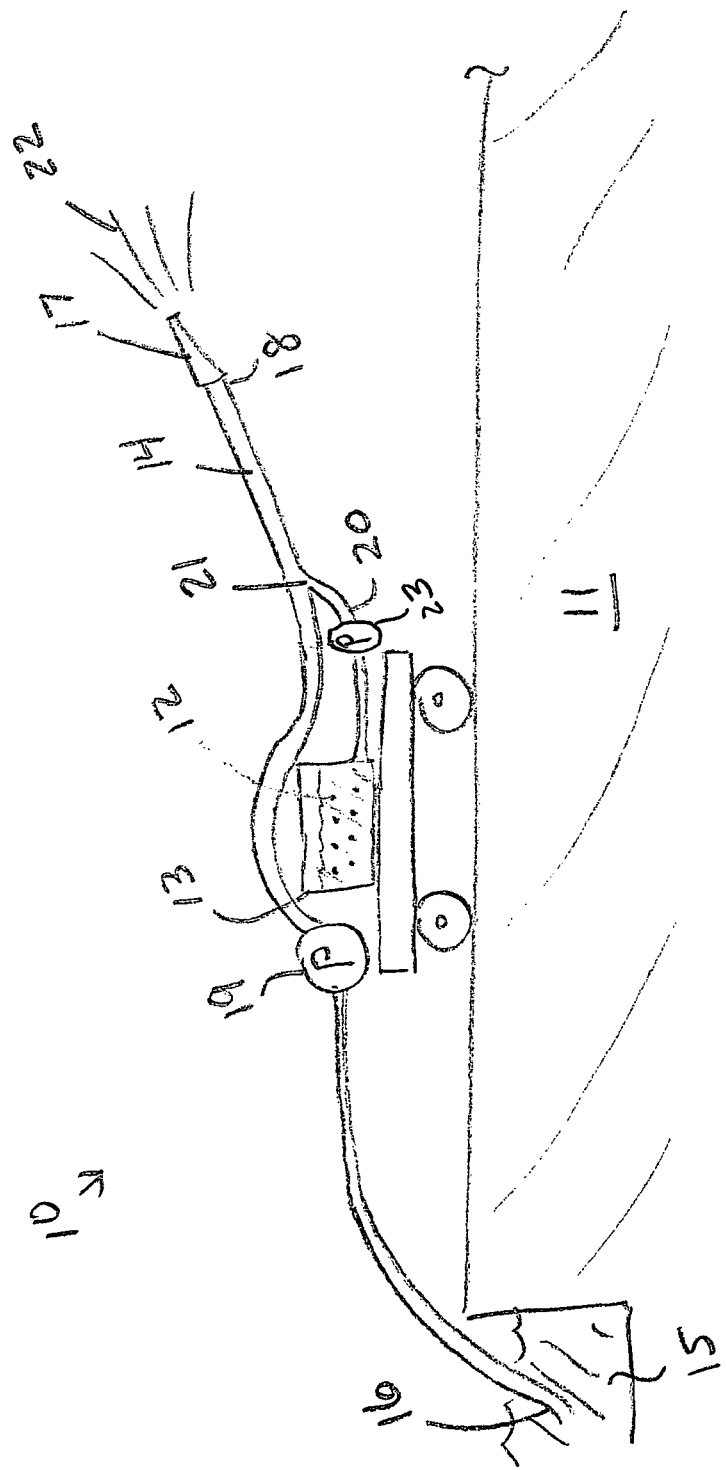

The present invention relates to systems and methods for constructing and rehabilitating marshes and wetlands, and, more particularly, to such systems and methods that are ecologically beneficial.

2. Description of Related Art

The present inventor has previously disclosed methods for building or restoring marshes and beaches, and also for dredging waterways in an environmentally friendly and cost-effective manner. These methods, which are disclosed, inter alia, in U.S. Pat. Nos. 3,971,148; 4,240,243; 4,434,943; 4,517,754; 4,521,305; 4,575,960; 4,628,623; 4,759,664; 4,896,445; 5,167,469; and 5,211,511, which are incorporated by reference hereinto, utilize a high-pressure nozzle to spray a thin layer of slurry material over a large area. In the '148 patent, a dredge cutter head is described that is self-cleaning; in the '243 patent, satellite harvesters are used to harvest underwater aquatic growth; in the '943 patent, a pump intake cutter head is disclosed for pumping an aquatic growth slurry from a waterway or body of water; in the '754 and '960 patents, a cutterhead attachment for a dredge is described; in the '305 patent, a rotating self-cleaning screen is provided; in the '623 patent is described a turbidity control system for a dredge cutterhead; in the '664 patent, the slurry is formed of a solid material and water at a first location and pumped to a remote location for increasing the elevation of an area at the remote location; in the '445 patent, a waterway is dredged, and the dredged material is used to form a slurry that is then distributed over the adjoining area in a layer sufficiently thin to avoid negative impact on the environment; in the '469 and '511 patents, a slurry distribution system is disclosed.

Natural habitat disappearance is a persistent problem, and can be caused by a variety of damaging factors, including, but not limited to, human-caused factors and pollution. Until now, marsh and wetland restoration has been an expensive and labor-intensive process, since re-planting heretofore has been performed manually.

SUMMARY OF THE INVENTION

An aspect of the present invention is directed to the construction and rehabilitation of marshes and wetlands in particular, and in the dispersion of seed and/or vegetative material in general. Such vegetative material may include, but is not intended to be limited to, fragments or plants that will propagate on their own.

In one embodiment is provided a method for rehabilitating a marsh or wetland. The method comprises the step of inserting seed and/or vegetative material into liquid or slurry emerging from a high-pressure spray nozzle to form a mixture. The mixture is then sprayed in a thin layer over a marsh or wetland area desired to be re-seeded or re-vegetated.

A system of the present invention in one aspect is for rehabilitating a marsh or wetland. The system comprises a container for holding seeds and a high-pressure spray nozzle. A hose is in fluid contact with a source of liquid at a first end and the spray nozzle at a second, opposed end.

A pump is provided for pumping liquid from the liquid source into the hose. Also provided is a conveyance tube that leads from the seed container to an aperture in the hose. The aperture is positioned downstream of the pump, so that, when the nozzle is in use, a vacuum is created at the aperture for drawing seed into a liquid stream being ejected by the spray nozzle to form a liquid-seed mixture. Means are also provided for directing the spray of liquid-seed mixture over a desired area remote from the liquid source.

In an alternate embodiment a system is provided that comprises a container for holding seeds and a mixing tank having means for agitating contents thereof. A means for transporting seeds from the container and liquid into the mixing tank is also provided, along with a high-pressure spray nozzle.

A hose is in fluid contact with the mixing tank at a first end and the spray nozzle at a second, opposed end. A pump is provided for pumping mixed seed and liquid from the mixing tank into the hose. Means are provided for directing the spray of liquid-seed mixture over a desired area remote from the liquid source.

The present invention provides considerable savings in cost and time to construct or rehabilitate a marsh or wetland.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 1 is a schematic diagram of a system for distributing a liquid-seed mixture over an area to be rehabilitated.

FIG. 2 is a top plan view of a second embodiment of a system for distributing a liquid-seed mixture over an area to be rehabilitated.

FIG. 3 is a side view of the system of FIG. 2.

DETAILED DESCRIPTION OF THE PREFERRED EMBODIMENTS

A description of the preferred embodiments of the present invention will now be presented with reference to FIGS. 1-3.

A first embodiment of a system 10 (FIG. 1) of the present invention, believed at the time of filing to represent a preferred embodiment, in one aspect is for constructing or rehabilitating a marsh or wetland 11. The system 10 comprises a container for holding seeds and/or other propagatable vegetative material 12. The vegetative material will in the following be referred to as "seed," although other propagatable material is also intended to be subsumed under this term. In addition to the seeds and/or vegetative material, other additives may be included, such as, but not intended to be limited to, fertilizer, a pH-adjusting composition, seed stabilization and placement enhancers, and slurry stabilization enhancers.

In a preferred embodiment the container comprises an agitator tank 13 into which the seeds 12 are directed and mixed with water or with a slurry of dredged material and water. A hose 14 is in fluid contact with a source of liquid, such as a body of water 15, at a first end 16. A high-pressure spray nozzle 17 is attached to the hose 14 at a second end 18 opposed to the first end 16.

In the first embodiment 10, a pump 19 is positioned upstream of the agitator tank 13 for pumping liquid or slurry (which will be referred to hereinafter as "liquid") from the liquid source 15 into the hose 14. A conveyance tube 20 leads from the agitator tank 13 to an aperture 21 in the hose 14. The aperture 21 is positioned downstream of the pump 19, so that, when the nozzle 17 is in use, a vacuum is created at the aperture 21 for drawing seed 12 into a liquid stream 22 being ejected by the spray nozzle 17 that comprises a mixture of the contents of the agitator tank 13 and liquid from the source 15. The angle 23 at which the tube 20 meets the hose 14 will determine the rate at which the seed 12 is drawn into the stream 22.

Means are also provided for directing the spray 22 of liquid-seed mixture over a desired area 11 remote from the liquid source 15. Such a directing means may comprise, for example, devices such as are disclosed in the previously cited '664 or '445 patents, although these are not intended as limitations.

A second embodiment of the reseeding system 30 (FIGS. 2 and 3) includes a container 31 for holding seeds 32 and a mixing tank 33 having means for agitating contents thereof. A pump 34 is used for transporting liquid 35 from, for example, a body of water 36 into the mixing tank 33.

A hose 37 is in fluid contact with the mixing tank 33 at a first end. The hose 37 extends to the suction side of the pump 34, with the suction drawing the mixture 40 into the stream. A high-pressure spray nozzle 38 is in fluid contact with the pressure side of the slurry pump 34 at a second, opposed end 39. The pump 34 also serves to pump, by suction, the seed and liquid mixture 40 from the mixing tank 33 into the suction hose 37.

As described above, means are provided for directing the spray of liquid-seed mixture 40 over a desired area remote from the liquid source 36.

In another embodiment, a separate pump 23 could be provided for pumping seed from the container into the slurry on the pressure side of the slurry pump, pumping at a greater pressure than that of the pressurized slurry.

These systems 10, 30 can be a component of a unitary dredging unit having a cutting head 41 at a front end 42 and means for channeling the dredged material in a slurry to the nozzle 38, as described in the present inventor's previously issued patents. Thus in a single step, both dredging, construction, and rehabilitation are effected, positively affecting the environment.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

What is claimed is:

1. A method for constructing or rehabilitating a marsh or wetland comprising the steps of:
   inserting a propagatable material into liquid or slurry to form a mixture;
   spraying the liquid-propagatable material mixture from a spray nozzle over a marsh or wetland area desired to be rehabilitated; and
   channeling the propagatable material into a container;
   wherein the spraying step comprises placing the container downstream of a pump and upstream of the nozzle, and using the pump to eject the mixture;
   wherein the container is in fluid communication with an aperture in a hose extending between the pump and the nozzle;
   wherein the propagatable material-inserting step comprises drawing the propagatable material into the hose by means of a vacuum created at the aperture by fluid being directed from the pump to the nozzle;
   wherein the propagatable material is inserted via a tube extending between the hose aperture and the container; and
   wherein the tube meets the hose aperture at an angle that is adjustable for affecting a rate of the propagatable material being drawn into the hose.

2. The method recited in claim 1, further comprising the step of adding to the liquid or slurry at least one of a fertilizer, a pH-adjusting composition, a seed stabilization and placement enhancer, and a slurry stabilization enhancer.

3. The method recited in claim 1, further comprising the steps of extending a second hose from an upstream end of the pump to a body of water, and forming the liquid or slurry using water pumped from the body of water.

4. The method recited in claim 1, further comprising the steps of:
   dredging a marsh or wetland;
   using dredged material from the dredging step to form the liquid or slurry into which the propagatable material is inserted.

5. A method for constructing or rehabilitating a marsh or wetland comprising the steps of:
   extending a first hose from an upstream end of a pump to a body of water;
   forming a liquid or slurry using water pumped from the body of water;
   inserting a propagatable material into the liquid or slurry to form a mixture;
   spraying the liquid-propagatable material mixture from a spray nozzle over a marsh or wetland area desired to be rehabilitated; and
   channeling the propagatable material into a container;
   wherein the spraying step comprises placing the container downstream of the pump and upstream of the nozzle, and using the pump to eject the mixture;
   wherein the container is in fluid communication with an aperture in a second hose extending between the pump and the nozzle; and
   wherein the propagatable material-inserting step comprises drawing the propagatable material into the second hose by means of a vacuum created at the aperture by fluid being directed from the pump to the nozzle.

6. The method recited in claim 5, further comprising the step of adding to the liquid or slurry at least one of a fertilizer, a pH-adjusting composition, a seed stabilization and placement enhancer, and a slurry stabilization enhancer.

7. The method recited in claim 5, wherein the propagatable material is inserted via a tube extending between the hose aperture and the container; and
   wherein the tube meets the hose aperture at an angle that is adjustable for affecting a rate of the propagatable material being drawn into the second hose.

8. The method recited in claim 5, further comprising the steps of:
   dredging a marsh or wetland;
   using dredged material from the dredging step to form the liquid or slurry into which the propagatable material is inserted.

* * * * *